United States Patent Office 3,537,657
Patented Nov. 3, 1970

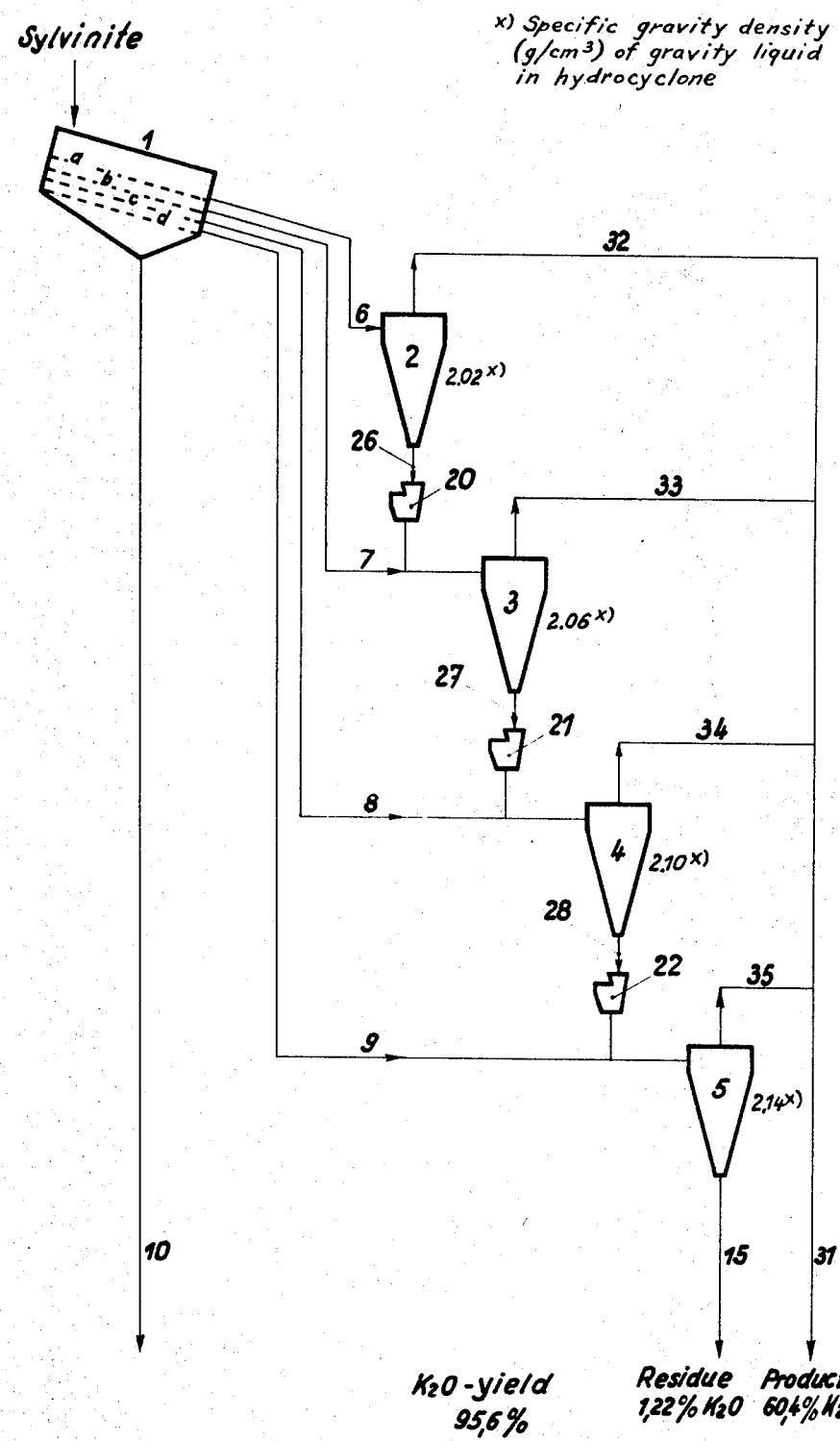

3,537,657
PROCESS FOR THE UPGRADING OF POTASH MINERALS CONSISTING ESSENTIALLY OF SYLVINITE
Hans Henne and Arno Singewald, Kassel, Germany, assignors to Wintershall Aktiengesellschaft, Hauptverwaltung, Kassel, Germany
Continuation-in-part of application Ser. No. 593,563, Nov. 10, 1966. This application May 8, 1969, Ser. No. 822,896
Int. Cl. B04c 5/26
U.S. Cl. 241—20                         4 Claims

ABSTRACT OF THE DISCLOSURE

A continuous process for the upgrading of potash minerals consisting essentially of sylvinite by gravity separation in a plurality of hydrocyclones respectively containing gravity liquids of different specific gravity to obtain sylvine concentrates (KCl) and NaCl in concentrated form.

CROSS-REFERENCE TO RELATED APPLICATIONS

The present application is a continuation-in-part application of the copending application filed under the Ser. No. 593,563 on Nov. 10, 1966 and now abandoned.

BACKGROUND OF THE INVENTION

The present invention relates to a continuous process for the upgrading of potash minerals consisting essentially of sylvinite by gravity separation to obtain potash values (sylvine) therefrom.

The increasing demand for potash fertilizers requires extending processing of potash minerals which contain halite (NaCl) and other constitutes.

SUMMARY OF THE INVENTION

It is an object of the present invention to provide a process according to which potash concentrates can be obtained in highly enriched form from mixtures containing such potash values.

It is another object of the present invention to provide a process according to which concentrates are recovered having particles of optimum size.

With these objects in view, the process according to the present invention for the manufacture of potash concentrates from sylvinite containing such potash values by gravity liquid separation mainly comprises the following steps:

(a) disintegrating the minerals into coarse particles;
(b) classifying the disintegrated minerals according to their particle sizes into at least three fractions;
(c) passing the fractions into at least three hydrocyclones which are connected in series at the apex discharge ends and in parallel at the upper ends thereof and respectively containing gravity liquids of increasing specific gravities, so that the coarsest particle fraction is suspended in the liquid with the lowest specific gravity, the smallest particle size fraction in the liquid with the highest specific gravity, and all further particle size fractions between the coarsest and the smallest correspondingly in liquids with specific gravities between the lowest and the highest specific gravity;
(d) separately recovering the floated components from the upper end and the settled components from the apex discharge end of each hydrocyclone;
(e) collecting the floated components consisting of coarse sylvine (KCl) from all hydrocyclones;
(f) disintegrating the settled components from the apex discharge end of a respective hydrocyclone to a particle size corresponding to the particle size of the particle fraction passed into the next following hydrocyclone having the next higher specific gravity;
(g) passing said disintegrated components together with freshly classified particles having the same particle size into the next following hydrocyclone having the next higher specific gravity; and
(h) repeating the steps (c)–(g) to pass the originally coarsest fraction successively disintegrated to the hydrocyclone with the smallest fraction, whereby at least steps (c)–(h) are carried out continuously to thereby recover highly separable sylvine concentrates (KCl) in the form of floated components from each hydrocyclone and NaCl highly concentrated as settled components from the last hydrocyclone.

The process of the present invention avoids disintegration of the total raw material to a particle size below a given size determined by a preliminary test. In the following table, the intergrowth amounts of sylvine from a crude sylvinite are listed in dependency on the particle size.

TABLE 1

| Particle size, mm. | −0.2 | 0.2–0.5 | 0.5–0.75 | 0.75–1.0 | 1.0–1.5 | 1.5–2.0 | 2.0–2.5 |
|---|---|---|---|---|---|---|---|
| Intergrowth Sylvine in percent | 99 | 97 | 93 | 81 | 66 | 42 | 17 |

In a one-step gravity separation, the starting material must be ground, according to Table 1 in its entirety to a particle size of less than 0.75 mm. in order to obtain a 93% yield of sylvine as the floated concentrate. With the process according to the present invention, however, in which the gravity separation is carried out in several steps after screening the disintegrated raw material into graded fractions, it is possible to recover more than half of the amount of sylvine originally present in the crude salt from a particle fraction having a particle size of between 1–2 mm. and only a small fraction of the original charge has to be disintegrated to a particle size of less than 0.75 mm. in order to obtain the abovementioned or even a better yield of sylvine as the floated concentrate.

The process of the present invention thus enables the manufacture of potassium salts from coarse particles, which is a considerable technical advance as dust problems are avoided. Another advantage of the new process results from the fact that it is no longer necessary to consider variations of the raw material due to irregularities of the deposits (field sources), as during the performance of the process those particles are selected which have to be further disintegrated, whereas from the already disintegrated particles desired constituents of the material may be separated off.

In view of the high energy demand for all grinding processes, another important advantage of the process according to the present invention will be appreciated.

The separation velocity in a hydrocyclone depends according to the equation of Stroke's $(\rho_1 - \rho_2) \cdot d^2$ not only upon the specific gravity of the particle and the gravity liquid, but also upon the average particle diameter of the fractions to be separated. In the above formula $\rho_1$=the density of the solids, $\rho_2$=the density of the liquid, and $d$=the average particle diameter.

Therefore particles having the same value for $$(\rho_1 - \rho_2) \cdot d^2$$

have also the same separation velocity. Particles having small differences with respect to their densities can be separated only if the particle size distribution is close.

The process according to the present invention in which the disintegrated charge is separated according to the particle size in different fractions takes this relationship between density and volume or diameter of the particles to be separated from each other into account. Therefore, it is also possible to separate KCl and NaCl particles from each other whereby the NaCl particles are recovered as sediment. A KCl/NaCl mixture is, for instance, obtained after the separation of kieserite from hard salt by another separation process or by upgrading of sylvinite into the main components of KCl and NaCl.

A particle having a given size containing only 10% by weight of KCl in intergrowth form is settled in a liquid with a specific gravity of 2.155. With a content of KCl in the order of 50%, such a particle would settle only in a liquid having a specific gravity of less than 2.07 to 2.08 g./cm.$^3$, that is, in a stepwise gravity separation such an intergrown particle passes through one or more intermediate disintegrations and can thereby be broken down into its components and separation of these components can be effected. Even sludge forming components which are very often constituents of kieserite containing hard salts can be removed in relatively coarse form, thereby avoiding objectionable sticking onto the minerals.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The drawing is a schematic view of the apparatus for carrying out the present invention.

DESCRIPTION OF THE PREFERRED EMBODIMENTS

Example 1

The process according to the present invention permits the isolation of potash concentrate containing 60.4% by weight of $K_2O$ from a coarse crystallized crude potash salt whereby a yield of 95.6% is obtained.

The process may be carried out in an arrangement as schematically illustrated in the drawing in which four upright hydrocyclones are used. The raw material processed was a sylvinite containing 30.06% KCl and 69.94% NaCl. In a preliminary test it was ascertained that by grinding the raw mineral to a grain size of about 1 mm. diameter the components KCl and NaCl are separated to 95% from each other, that is the particles do not any longer constitute intergrown conglomerates of these components, whereas when the raw material is ground to a particle size of about 2.5 mm. diameter only 66% of the intergrown conglomerates are separated into individual components.

The raw material was disintegrated by crushers, grinders or the like in a known manner into particles ranging in size from 5 mm. diameter to about 0.3 mm. diameter and then separated in a screening device 1 into four fractions a, b, c and d of diminishing grain size and from the screening device 1 the fractions a–d were respectively fed through conduits 6, 7, 8 and 9 into the hydrocyclones 2, 3, 4 and 5, respectively, which respectively contain gravity liquids of increasing specific gravity. The fines passing through the screen of smallest mesh of the screening device 1 were removed from the bottom of the screening device through the conduit 10 since such fines having a diameter of less than 0.2 mm. could not be worked up in the hydrocyclones. The settled components from the hydrocyclones 2–4 which are constituted either of particles of substantially pure NaCl which has a higher specific gravity than KCl or of intergrown particles having a relatively large percentage by weight of NaCl were respectively withdrawn from the apex discharge ends of the hydrocyclones 2–4 through the pipes 26, 27 and 28 into the mills 20, 21 and 22 where the particles were respectively ground down to a grain size substantially identical to the grains size of the next fraction fed from the screening device 1 respectively through pipes 7, 8 and 9 into the next following hydrocyclone. The grinding of the particles in the mills 20, 21 and 22 was carried out in such a manner that resulting fines below a grain size of 0.2 mm. will not exceed 20% of the total mass fed into the respective mill. The floating particles from each hydrocyclone, which contain either particles of substantially pure KCl or intergrown particles having a relatively large percentage by weight of KCl, were withdrawn from the top ends of the hydrocyclones 2–5 respectively through the conduits 32, 33, 34 and 35 which are connected in parallel by the conduit 31. From the apex discharge end of the hydrocyclone 35 highly concentrated NaCl as the final settled components was withdrawn through the conduit 15, whereas highly concentrated potash values were withdrawn through the conduit 31.

The following table shows the grain size of the various fractions separated from each other in the screening device 1, the specific gravity of the gravity liquid respectively contained in the hydrocyclones 2–5, into which the respective fractions are fed respectively through the conduits 6–9, the percentage of KCl contained in each fraction, the degree of disintegration into separate components of each fraction, as well as the grain size obtained in the final end product withdrawn through the conduit 31.

TABLE 2

|  | Fraction | | | |
| --- | --- | --- | --- | --- |
|  | a | b | c | d |
| Sieve analysis, mm | 3–5, 8.0% | 1.5–3, 38.8% | 0.8–1.5, 33.5% | 0.3–0.8, 19.7% |
| Percent KCl | 24.0 | 28.0 | 31.0 | 35.0 |
| Gravity liquid, g./cm.$^3$ | 2.02 | 2.06 | 2.10 | 2.14 |
| Degree of disintegration into separate components, percent | 30.0 | 68.0 | 88.0 | 99.0 |
| Sieve analysis of product, percent | 2.1 | 29.3 | 42.5 | 26.1 |

Table 3 more specifically shows the amount of KCl and NaCl contained in a total charge of 100 kilograms of raw mineral and the amounts of each fraction fed into the respective hydrocyclone as well as the amounts of these components which are respectively discharged from the apex and the overflow discharge end of each hydrocyclone.

Table 3

| Charge for Hydrocyclone | From Screening Device 1 | Upper end Discharge + from Hydrocyclone | = Sum | = Upper end Discharge | + Apex Discharge | pipe |
|---|---|---|---|---|---|---|
| "2" | a = 1.92 (K) / 6.08 (Na) | "6" — | 1.92 (K) / 6.08 (Na) | = 1.35 (K) / 6.01 (Na) | + 0.57 (K) / 0.07 (Na) | "32" |
|  |  | "20" "26" |  |  |  |  |
| "3" | b = 10.86 (K) / 27.94 (Na) | "7" + "2" | = 12.21 (K) / 33.95 (Na) | = 4.07 (K) / 33.30 (Na) | + 8.14 (K) / 0.65 (Na) | "33" |
|  |  | "21" "27" |  |  |  |  |
| "4" | c = 10.39 (K) / 23.11 (Na) | "8" + "3" | = 14.46 (K) / 56.41 (Na) | = 2.25 (K) / 55.81 (Na) | + 12.21 (K) / 0.60 (Na) | "34" |
|  |  | "22" "28" |  |  |  |  |
| "5" | d = 6.89 (K) / 12.81 (Na) | "9" + "4" | = 9.14 (K) / 68.62 (Na) | = 1.35 (K) / 68.50 (Na) | + 7.79 (K) / 0.12 (Na) | "35" |
|  |  |  |  | "15" |  |  |
| Total Charge | 30.06 (K) * / 69.94 (Na) ** |  | = 1.35 (K) / 68.50 (Na) | + 28.71 (K) / 1.44 (Na) | "31" |  |
|  |  |  | Residue 1.22% K₂O | + Product 60.4% K₂O |  |  |

\* (K) = kg KCl
\** (Na) = kg NaCl

The numerals refer to reference numerals of the drawing

The foregoing example is set forth by way of illustration and without limitation of the present invention.

The process of the present invention may be carried out with a minimum of three hydrocyclones and also with a number of hydrocyclones more than four, for instance five or six hydrocyclones in which, of course, the screening device has to have a corresponding number of screens.

The following example is given for a process using five hydrocyclones.

Example 2

Sylvinite was disintegrated and classified in a screening device having five screens into particle fractions of between about 3.5–5 mm.; 2–3.5 mm.; 1.5–2 mm.; 1–1.5 mm.; and 0.2–1 mm., and these fractions were passed separately to five hydrocyclones containing gravity liquids having density differences of 0.02 to 0.06 g./cm.$^3$ from each other, whereby again the coarsest fraction is directly fed into the hydrocyclone containing a gravity liquid having lowest specific gravity whereas the finest particle fraction is fed into the hydrocyclone containing a gravity liquid having the highest specific gravity and the fractions between the coarsest and the finest fraction were respectively fed into hydrocyclone containing gravity liquids having a specific gravity between the lowest and the highest specific gravity. It is also to be understood that the five hydrocyclones are connected at the overflow side and at the apex discharge end to each other in the manner as shown in the figure.

The examples illustrate the improvement obtained with the process of the present invention, that is, sylvinite may be separated into sylvine (KCl) and halite (NaCl) in a very convenient and economical manner even though the densities of the aforementioned components have only slight differences. The components are recovered not only in a very concentrated form, but also with relatively coarse particles whereby dust problems and grinding of the whole charge to the smallest particle size are avoided.

According to the process of the present invention, highly pure potash values can be recovered with high yields from potash minerals such as sylvinite, and mixtures containing such potash values.

In contrast to known processes it is not necessary with the process of the present invention to disintegrate the crude minerals completely by milling or grinding the same into very fine particles. The gravity separation and the grinding can be carried out in correlated steps, whereby those particles are selected which have to be divided into smaller particles. Furthermore, the separation of the components in the hydrocyclones is considerably improved, as in each separation step only particles are used which have specific and very similar diameters. Care, however, has to be taken in the disintegration steps which should be performed in such a manner to hold the formation of fines to a minimum and the amount of fines or dust particles should not exceed 20% of the total disintegrated amount. In the intermediate disintegration steps the particles are ground down to a particle size corresponding to the next following step in an amount of about 80%.

As gravity fluids, stable or unstable separation liquids can be used. Stable gravity liquids may be in the form of mixtures of halogenated hydrocarbons with organic liquid of low density preferably toluene having a specific gravity of 0.87 g./cm.$^3$, benzene having a specific gravity of 0.88 g./cm.$^3$, or Diesel fuels. As halogenated hydrocarbons especially tetrabromoethane "TBE" having a specific gravity of 2.96 g./cm.$^3$, and the like have been found appropriate.

Suitable mixtures such as used in the process of Example 1 can be prepared as follows:

TABLE 4

|  | TBE | | Toluene | | Gravity liquid TBE and toluene | |
|---|---|---|---|---|---|---|
|  | Liter | Kg. | Liter | Kg. | Liter | Kg. |
| Density: |  |  |  |  |  |  |
| 2.02 | 55.0 | 162.8 | 45.0 | 39.2 | 100 | 202 |
| 2.06 | 56.9 | 168.5 | 43.1 | 37.5 | 100 | 206 |
| 2.10 | 58.9 | 174.3 | 41.1 | 35.7 | 100 | 210 |
| 2.14 | 60.8 | 180.0 | 39.2 | 34.0 | 100 | 214 |

The recovery of stable gravity liquids after separating the solids can be performed in a manner known per se by readjusting the density either by addition or distilling off one or more of the components.

As unstable gravity liquids may be used aqueous saturated solutions of KCl and NaCl which are charged with ferrosilicon or related substances.

A suitable gravity solution may be composed as follows: KCl 146 g./l; NaCl 251 g./l.; H$_2$O 842 g./l. charged with ferrosilicon or magnetite to obtain a suitable turbidity density.

It will be understood that each of the elements described above, or two or more together, may also find a useful application in other types of process for the upgrading of potash minerals differing from the types described above.

While the invention has been illustrated and described as embodied in a continuous process for the upgrading of potash minerals consisting of sylvinite, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Improved process for the separation of potash minerals consisting essentially of sylvinite by gravity liquid separation to recover potash values and the accompanying constituents in highly concentrated form therefrom, comprising the following steps: disintegrating said minerals into coarse particles; classifying said disintegrated minerals according to their particle sizes into at least three fractions; passing said fractions separately into at least three hydrocyclones which are connected in series at the apex discharge ends and in parallel at the upper discharge ends thereof and respectively containing gravity liquids of increasing specific gravity, so that the coarsest particle fraction will be suspended in the liquid with the lowest specific gravity and the smallest particle size fraction other than the finest fraction from said classifying step in the liquid with the highest specific gravity and all further particle fractions between the coarsest and the smallest correspondingly in liquids with specific gravities between the lowest and highest specific gravity; separately recovering the floated components from the upper end and the settled components from the apex discharge end of each hydrocyclone; collecting the floated components consisting of coarse sylvine (KCl) from all hydrocyclones; disintegrating the settled components consisting of NaCl and middlings of KCl and NaCl from the apex discharge end of each but the last hydrocyclone to a particle size corresponding to the particle size of the particle fraction passed into the next following hydrocyclone having the next higher specific gravity; and passing said disintegrated components from the respective hydrocyclone into the next following hydrocyclone having the next higher specific gravity, at least the steps c–g being carried out continuously to thereby recover highly separable sylvine concentrates (KCl) in the form of floated components from each hydrocyclone and NaCl highly concentrated as settled components from the last hydrocyclone.

2. A process according to claim 1, wherein said disintegrated minerals are classified according to said particle size into more than three fractions, and wherein a number of hydrocyclones equal to the number of fractions are used.

3. A process according to claim 1, wherein said potash minerals consisting essentially of sylvinite are disintegrated and classified into particle fractions of between 3–5 mm.; 1.5–3 mm.; 0.8–1.5 mm.; and 0.3–0.8 mm., which fractions are passed separately into four hydrocyclones containing gravity liquids having density differences of 0.4 g./cm.$^3$ from each other.

4. A process according to claim 1, wherein said potash minerals consisting essentially of sylvinite are disintegrated and classified into particle fractions of between about 3.5–5 mm.; 2–3.4 mm.; 1.5–2 mm.; 1–1.5 mm.; and 0.2–1 mm., which fractions are passed separately into five hydrocyclones containing gravity liquids having density differences of 0.02–0.06 g./cm.$^3$ from each other.

References Cited

UNITED STATES PATENTS

| | | |
|---|---|---|
| 2,139,047 | 12/1938 | Tromp. |
| 2,590,756 | 3/1952 | Colin. |
| 2,668,667 | 2/1954 | Fern. |
| 2,701,641 | 2/1955 | Krijgsman. |
| 2,738,069 | 3/1956 | Roller. |
| 2,781,906 | 2/1957 | Fontein. |
| 2,932,395 | 4/1960 | Marot. |
| 3,063,562 | 11/1962 | Adams. |
| 3,331,504 | 7/1967 | O'Connell. |

FOREIGN PATENTS 887,492  1/1962  Great Britain.

FRANK W. LUTTER, Primary Examiner

W. L. MENTLIK, Assistant Examiner

U.S. Cl. X.R.

209—2, 17, 173, 211; 241—29